United States Patent [19]

Pullman et al.

[11] Patent Number: 5,060,418
[45] Date of Patent: Oct. 29, 1991

[54] METHOD OF TRANSPLANTING A CONTAINER GROWN PLANT

[75] Inventors: Gerald S. Pullman, Renton; Michael J. Yancey, Puyallup, both of Wash.

[73] Assignee: Weyerhaeuser Company, Tacoma, Wash.

[21] Appl. No.: 394,910

[22] Filed: Aug. 17, 1989

[51] Int. Cl.⁵ .................... A01G 9/10; A01G 23/04
[52] U.S. Cl. ........................................ 47/58; 47/74; 111/100
[58] Field of Search ............... 47/73, 74, 77, 85, 58, 47/86, 56, 57.6; 111/100, 104, 105, 109, 114

[56] References Cited

U.S. PATENT DOCUMENTS

| | | | |
|---|---|---|---|
| 1,775,838 | 9/1930 | Wedge | 47/74 |
| 2,172,574 | 9/1939 | Campbell | 47/58 |
| 2,592,052 | 4/1952 | McKenna | 47/58 |
| 2,616,220 | 11/1952 | Welch | 47/58 |
| 2,651,885 | 9/1953 | Hedrick et al. | 47/15 |
| 2,720,726 | 10/1955 | Ferguson | 47/58 |
| 2,866,296 | 12/1958 | Meadows | 47/58 |
| 2,901,864 | 9/1959 | Hiler | 47/58 |
| 3,543,438 | 12/1970 | Edwards | 47/87 |
| 3,667,159 | 6/1972 | Todd | 47/87 |
| 3,722,137 | 3/1973 | Kesinger et al. | 47/87 |
| 3,973,355 | 8/1976 | McKenzie | 47/86 |
| 4,035,951 | 7/1977 | Dedolph | 47/74 |
| 4,241,537 | 12/1980 | Wood | 47/77 |
| 4,579,578 | 4/1986 | Cooke | 47/77 |
| 4,586,288 | 5/1986 | Walton | 47/73 |
| 4,970,972 | 11/1990 | Williames | 111/111 |

FOREIGN PATENT DOCUMENTS 1399822 7/1975 United Kingdom .............. 47/73

Primary Examiner—James R. Feyrer

[57] ABSTRACT

The invention is a method for treating a plant growth medium containing a plant so that the growth medium remains intact around the roots during transplanting operations. This involves treating the growth medium shortly before transplanting with an adhesive-forming substance which will bond the particles of the growth medium to form an intact plug. The adhesive-forming substance must be physiologically innocuous. Materials such as warmed solution of agar or soluble alginates have been found to be very suitable. When an alginate is used, it is rendered into an insoluble gel by secondary application of a chemical salt such as calcium nitrate. The method is particularly useful for growing seedlings or cuttings which must be transplanted while the root structure is still delicate and subject to damage from handling.

22 Claims, 1 Drawing Sheet

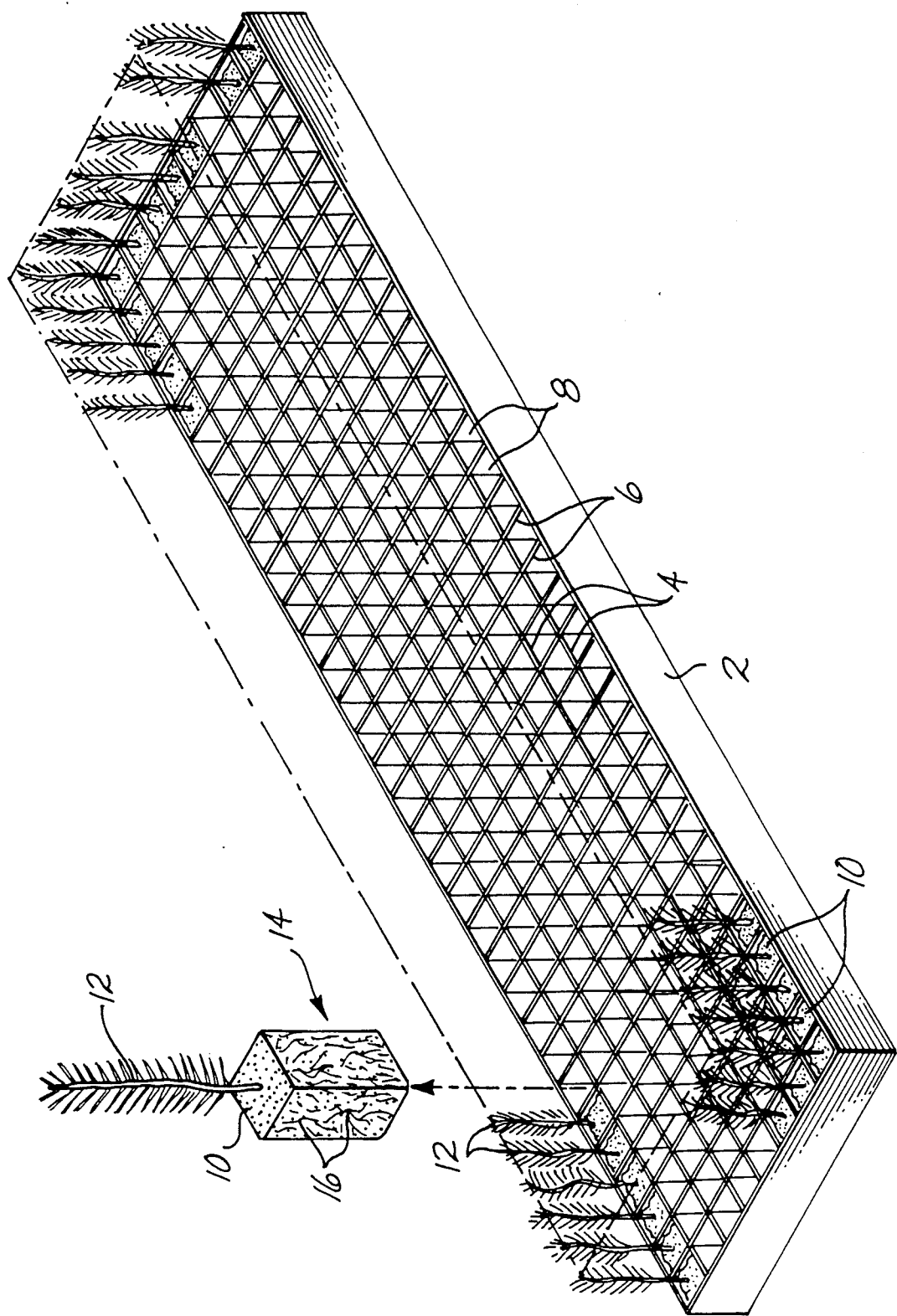

METHOD OF TRANSPLANTING A CONTAINER GROWN PLANT

BACKGROUND OF THE INVENTION

The present invention is a method of transplanting a container grown plant which minimizes physical and biological disturbance to the plant. The method is particularly well adapted for transplanting plants grown side by side in grid-like trays.

Many plants are started from seeds or cuttings in glass houses or similar controlled environment conditions. It is often the case that these plants must be transplanted to larger containers as they grow in size. Normally this is done by pushing or lifting the plant out of the original container with the expectation that the root structure will bind the original growing medium into an intact plug. Starter rooting media are generally very porous and often the root structure is not sufficient to maintain the integrity of the medium when it is removed from the original container. This results in the growing medium falling away from the roots so that there is considerable disturbance to the roots and trauma to the plant and often major transplant loss. The plants can suffer a considerable set back and there may be a significant increase in the time required to grow the plant to the desired size. This problem is particularly severe with cuttings that ordinarily have not developed a vigorous root structure by the time of a first transplant. It can also give a false appearance of poor quality if the rooted cuttings are sold directly into the consumer market.

One method which was developed for overcoming friability of the growth medium is described by Finch in British Patent 1,399,822. This inventor describes a potting substrate containing at least two substances which subsequently form an alginate gel by base exchange. The inventor notes that this ensures adequate air and moisture passage and heat exchange within the growth medium. He also notes that it can facilitate removal of the plant and soil mix from a container. The inventor draws an analogy that after gelation and hardening of the alginate the soil particles are cemented together "like bricks . . . in a wall."

A calcium alginate gel is preferred in the Finch process. The gel is created in situ by the inclusion of a soluble alginate in conjunction with a relatively low solubility calcium salt such as calcium citrate or sulphate. While the invention appears to be primarily directed to the formation of pelleted seeds, it can also be used to aid repotting with the use of automatic machinery. It is important to note that the soil is treated initially; i.e., when the seed is planted or before a cutting to be rooted is inserted into the mixture. The gel then forms over some period of time due to the poor solubility of the calcium salt.

The present inventors have found that there are significant disadvantages inherent in initially treating a potting soil mixture with a binder of the type described by Finch. As the seed germinates and roots begin to develop, or as roots begin to form on the cutting, it is desirable for the growth medium to be very loose and porous. It is necessary for the tender young roots to force their way through the soil mixture with the inevitable displacement of some of the soil particles. The soil mixture at this time must have good porosity to prevent waterlogging and provide good aeration. If the soil particles are tightly bonded, this early root growth can be significantly inhibited. There is a second problem as well. Most organic binders are subject to rapid decomposition due to the action of soil microflora. Thus, a medium which was initially sufficiently bonded to enable handling will often have degenerated into a mass of completely loose particles by transplant time. This is especially true when the growing period exceeds three or four weeks.

As will now be described, the present invention satisfactorily overcomes the above-noted deficiencies.

SUMMARY OF THE INVENTION

The present invention is a method of growing a plant so that it may be readily transplanted with minimum of physical or biological disturbance. It comprises placing a particulate plant growing substrate in a container to provide a porous growth medium for the plant. A seed, cutting or started plant is then inserted in the containerized growth medium. The terms seed, cutting, and started plant should be construed sufficiently broadly so as to include embryos, shoots or plantlets derived by tissue culture. After the seed or plant is inserted into the growing medium, it is grown to a desired size. Only at this time are the particles of the growth medium then lightly bonded with an adhesive-forming substance so as to unitize the growth medium into a plant containing plug. The seedling or cutting containing plug can then be removed essentially intact from the container without significant root disturbance.

The term "lightly bonded" should be interpreted to mean that the soil particles are not bound so tightly that they cannot be later readily forced apart as root growth proceeds after transplanting.

The above procedure overcomes both of the disadvantages noted earlier. The growth medium remains loose and friable up until the time of transplant. Further, there is no opportunity for biological deterioration of the adhesive-forming substance during the growth period prior to transplant.

The adhesive-forming substance must be essentially physiologically innocuous. The term innocuous is here defined to mean a material which will not injure the plant in any way but may be beneficial as would be the case when the adhesive-forming substance supplied desirable nutrients.

Another requirement of the adhesive forming substance is that it must form an aqueous solution of sufficiently low viscosity so that it can be applied and readily distributed throughout the plant growth medium. The material is preferably one that can be physically or chemically modified in situ so that its viscosity is significantly increased to the state where it becomes an effective adhesive material.

One form of physical modification would be to apply the material in a heated low viscosity solution which forms a gel upon cooling. It will be understood that the temperature of application should not be so great as to damage the plant. Most plants are capable of withstanding temperatures as high as 55° C. (131° F.) for at least short periods of time without any significant damage. Solutions of agar and gelatin would be examples of materials of the type that can be applied as a heated solution that gels to an adhesive state upon cooling to room temperature.

Other materials can be chemically modified in situ to an adhesive state. An example would be solutions of soluble alginates which can be insolubilized by subsequent treatment with a solution of a salt such as calcium nitrate.

Most complex carbohydrate and proteinaceous materials which can be brought into an aqueous solution of suitable viscosity are suitable as adhesive-forming binders. Among the suitable polysaccharides are dextrans, pectins, alginates, agars and agarose. In general the concentration of adhesive-forming substance should be such that the viscosity of an aqueous solution at the time of application does not exceed about 1000 mPa.s. Solutions with higher viscosity may fail to uniformly penetrate the porous plant growth medium.

The adhesive-forming substance can be applied in a number of different ways. It is usually preferred to apply it to the upper surface of the plant growth medium in the container where it is allowed to percolate down through the growth medium. However, it can be applied to the lower surface of the plant growth medium and allowed to move upward by capillarity. It may also be injected into the growth medium.

It is desirable to use the minimum amount of adhesive-forming substance that will bond the plant growth medium particles sufficiently so that they form a plug of good integrity which can be removed from the container without undue crumbling of the plug. The plug can then be manually or mechanically handled as it is transplanted into a larger container or a different growth environment.

It is an object of the present invention to provide a method of transplanting a container grown plant.

It is another object to treat the growth medium of a container grown plant with an adhesive-forming substance so that it can then be removed from the container as an intact plug.

It is a further object to treat the growth medium of a container grown plant so that it can be transplanted with a minimum of physiological damage to the plant.

These and many other objects will become readily apparent on reading the following detailed description taken in conjunction with the drawing.

BRIEF DESCRIPTION OF THE DRAWING

The single FIGURE is an example of a miniplug tray used for growing coniferous seedlings for later transplant into a nursery bed.

DETAILED DESCRIPTION OF THE PREFERRED EMBODIMENTS

Many nursery grown plants started in small individual containers must be transplanted one or more times as they grow to a desired size. Transplanting can cause considerable trauma to the plant if the soil mixture breaks up during the process sufficiently to cause damage to the root structure. To cite one example, it is now a common practice to start seedlings of forest coniferous species in glass houses instead of sowing the seed directly into nursery beds. This is usually done in gridlike trays with one seed being sown in each cell. One such tray is 8 cells wide and 32 cells long giving a total of 256 cells. Each cell has cross-sectional dimensions of approximately 15 mm ($\frac{3}{4}$") and they will typically have a soil depth of about 38 mm (1.5"). The seedlings are grown in these containers until they reach a height of 50–75 mm (2–3") before they are transplanted by automated machinery into a nursery bed. By starting the seedlings in a glass house in this fashion, the growing season can be considerably extended with the ultimate result that a larger and hardier seedling is then available for ultimate transplant into a forest environment. Occasionally cuttings will be used instead of seed and sufficient time must be allowed in the glass house for vigorous rooting to occur. For both seeds and cuttings this time will seldom be less than about 45 days. The glass house environment is normally very humid and cuttings, in particular, are normally grown in a fog or mist tent. For this reason the growth medium must be very porous to prevent water logging. Commonly it will be a peat-vermiculite mixture, or occasionally all vermiculite, although other soil mixtures are also commonly used.

The drawing shows a typical miniplug tray used for starting coniferous seedlings or cuttings in a glass house. The tray 2 is divided by longitudinal partitions 4 and transverse partitions 6 into a series of individual cells 8 of generally square cross section. The cells are filled with a porous growing medium 10 into which seeds are planted or cuttings inserted. After a sufficient growth time the seedlings or rooted cuttings and growth medium are removed from the tray as a plug 14 partially bound by the plant root system 16. The plugs can then be transplanted manually or mechanically. Normally each cell would be planted but many are shown empty in the drawing for the sake of clarity.

Depending on the particular type of tray used, the seedlings can either be removed from the top, by grasping the plant and pulling, by pushing the plug from the bottom, or by some combination of these two forces. Alternatively, the plug can be pushed out the bottom of the tray if the plant is not so large that it would be damaged by passage through the cell. This, of course, presumes that the cells have an open bottom portion.

Where growth has occurred for a sufficiently long time for the roots to hold the medium together, there is less problem in ejecting the individual plugs from the container. However, it is frequently not desirable to hold the plants for the length of time necessary to get this vigorous root development for reasons which may be either biological or economic. Under these circumstances, considerable breakup of the plug with attendant root damage and/or transplant shock will occur when the plants are removed from their individual containers.

Various methods have been tried to overcome the problem of growth medium friability upon transplanting. The patent to Finch is exemplary of these methods. However, biological response of the plants is often unsatisfactory when the growth medium is adhesively bonded at the beginning of the growing cycle. The present inventors have discovered that if bonding with a suitable material is delayed to a time immediately prior to transplant, eminently satisfactory results are achieved without physical or biological damage to the containerized plant.

A preferred adhesive-forming material is one which forms a hydrophilic gel in situ. Alginates and agar are good examples. Preservation of growth medium porosity in the plug is usually not as important at transplant time as it is earlier in the growing cycle. However, where a high level of porosity must be maintained alginates are the presently preferred adhesive-forming materials.

An adhesive material that forms a hydrophilic gel has the advantage of imparting better moisture retention at transplant time. There may be a considerable period of time between the last watering of the containerized plants and transplanting. Gel materials such as agar or alginates can help to reduce water stress if the period is overly long. This advantage is particularly noted in plants such as conifer seedlings that are transplanted into outdoor nursery beds. Several hours will often elapse between planting and the time when irrigation water can be applied. If the soil is very dry, severe moisture stress can occur. This problem is virtually eliminated by the use of a hydrophilic gel-type adhesive former applied to the growing medium shortly before transplanting.

EXAMPLE 1

A miniplug seedling tray was filled with a 50:50 peat-pearlite mixture for the following experiment. The tray was 8 cells wide and 12 cells long for a total of 96 cells. Each cell was $19 \times 19 \times 38$ mm and contained a volume of approximately 14 mL. Solutions were made containing 0, 4, 6, 8, 10 and 12 g/L of agar from Sigma Chemical Co., St. Louis, Mo. The growth medium was heated to a temperature in the range of 45°–48° C. and the agar solutions was heated to 55° C. 3 mL of each solution were applied to the upper surface of the growth medium in each cell with 16 replicates being made at each concentration. After cooling to room temperature and allowing to stand for a sufficient time for the agar to gel, the growth mixture was extracted using a small plunger to push it out of the bottom of the cell. The plugs receiving no agar or only 4 g/L agar fell apart. Those treated with agar concentrations of 6 and 8 g/L were significantly better although there was some crumbling upon removal. The plugs in the cells treated with agar at 10 and 12 g/L concentration were removed essentially intact. While actual seedlings were not used in this test, it is believed that the conditions employed would not have been detrimental to either seedlings or cuttings.

EXAMPLE 2

Miniplug trays having 64 cells of the same size as those of Example 1 were filled with a growth medium which in one case was 50:50 peat-pearlite and in another case all peat. Douglas-fir cuttings were placed in the peat-pearlite mix. Douglas-fir seedlings had been grown for three months in the all peat mix. The trays were flooded with either 1, 1.5, or 2% solutions of Protonal LF 20/60 alginate applying approximately 4 mL per cell. Protonal is available from Protan, Inc., North Hampton, N.H. The 2% alginate solution was poorly absorbed by the cells containing only peat. After absorption of alginate solution, the cells were flooded twice with a 200 mM solution of $Ca(NO_3)_2 \cdot 4H_2O$. This contains 23.6 g/L of hydrated calcium nitrate. The calcium nitrate treatments were applied about 15 minutes apart and were equivalent to about 4 mL of total solution.

After an adequate time for gelation, the plugs containing the cuttings and seedlings were removed from the cells. Some variability in quality was noted indicating poor uniformity of solution application. However, the plug quality of the peat:pearlite cells treated with 1% alginate was generally fair while those treated with 2% alginate was generally quite good. The integrity of plugs which did not receive the alginate was very poor. In the case of the seedling-containing plugs with an all peat growth medium good plug integrity was obtained at all three concentrations of alginate. Again the control plugs which did not receive the treatment had very poor physical integrity.

It is believed that any soluble alginate salt would be suitable for the treatment. Alginates can thus be selected from either alkaline metal or ammonium salts. Further, the insolubilizing salt can be selected from any material which would not prove phytotoxic to the plant and which has the capability of insolubilizing the alginate. These salts will generally be chosen from water soluble salts of calcium or magnesium.

Out planting tests of plugs treated with both alginate gels and agar are currently in progress. To date there does not appear to be any detrimental effect upon the contained plant when treated plants are compared to those transplanted from untreated plugs.

It will be readily apparent to those skilled in the art that many variations in the chemicals and procedures of the present method can be made without departing from the spirit of the invention. The invention should thus be regarded as being limited only as it is described in the following claims.

We claim:

1. A method of growing and preparing a plant for transplanting which comprises:
   placing a particulate plant growing substance in a container to provide a porous plant growth medium;
   placing a seed, cutting, or started plant in the growth medium;
   growing the plant to a desired size;
   after the plant has reached said desired size, treating the body of particles of the growth medium with a liquid adhesive forming substance in an amount and of a viscosity to allow permeation into substantially the volume of the container, said adhesive forming substance being essentially physiologically inert to said plant, said adhesive forming substance being selected from the group consisting of complex carbohydrate materials, proteinaceous materials, and mixtures thereof;
   allowing sufficient time for the adhesive to bond the growth medium particles into an essentially intact plug, and
   removing the intact plant containing plug from the container,
   whereby the plant can be transplanted with minimum physical and biological disturbance to the plant roots.

2. The method of claim 1 which comprises providing a plurality of plant containers joined side-by-side.

3. The method of claim 2 which comprises planting seeds in the growth medium in each of the joined containers, germinating said seeds, and growing the seedlings to a size suitable for transplanting prior to treatment with the adhesive-forming substance.

4. The method of claim 2 which comprises placing cuttings in the growth medium in each of the joined containers and rooting said cuttings prior to treatment with the adhesive-forming substance.

5. The method of claim 1 in which the bonding step comprises adding a relatively low viscosity aqueous solution of the adhesive forming substance to the particulate plant growth medium, said adhesive forming substance being of the type that can be chemically or physically modified in situ to act as a particle bonding agent.

6. The method of claim 5 wherein the viscosity of the adhesive-forming substance is reduced at the time of application by heating to a temperature no higher than that physiologically tolerable by the plant, said adhesive-forming substance forming an adhesive substance upon cooling to bond the particles of the growth medium.

7. The method of claim 5 in which the adhesive-forming substance is a water soluble type that may be chemically treated in situ to form an adhesive substance to bond the particles of growth medium.

8. The method of claim 5 in which the viscosity of the treating solution at the time of treating does not exceed about 1000 mPa.s.

9. The method of claim 5 in which the solution of adhesive-forming substance is applied to the upper surface of the plant growth medium in the container and allowed to percolate down through the medium.

10. The method of claim 5 in which the solution of adhesive-forming substance is applied to the lower surface of the plant growth medium in the container and allowed to move upward by capillarity.

11. The method of claim 5 in which the solution of adhesive-forming substance is injected into the plant growth medium.

12. The method of claim 5 in which the adhesive-forming substance is modified in situ to a hydrophilic gel state.

13. The method of claim 1 in which the adhesive-forming substance is selected from the group consisting of dextrans, pectins, alginates, agar, agarose and mixtures thereof.

14. The method of claim 13 in which the adhesive-forming substance is an aqueous solution of agar, said agar solution being heated to a temperature not exceeding about 55° C. at the time of application to reduce the viscosity of said solution.

15. The method of claim 14 in which the concentration of agar does not exceed about 12 g/L in the aqueous solution.

16. The method claim 14 which further comprises:
briefly heating the growth medium and plant contained therein while still in the container to a temperature not exceeding about 55° C. prior to application of the heated agar solution; then
cooling the plant and growth medium to ambient temperature following application of the heated agar solution so that the agar forms a particle bonding gel.

17. The method of claim 13 in which the adhesive-forming substance is a water soluble alginate.

18. The method of claim 17 in which the concentration of alginate in the treating solution does not exceed about 25 g/L.

19. The method of claim 17 in which the alginate solution is heated to a temperature not exceeding about 55° C. at the time of application.

20. The method of claim 17 which includes first treating the growth medium with an aqueous solution of an alkali metal or ammonium alginate, then further treating the medium with an aqueous solution of a salt capable of transforming the alginate to an insoluble gel form by cation exchange.

21. The method of claim 20 in which the insolubilizing salt is selected from the group consisting of calcium and magnesium salts, and mixtures thereof.

22. The method of claim 21 in which the insolubilizing salt is calcium nitrate.

* * * * *